Figures 1, 2:
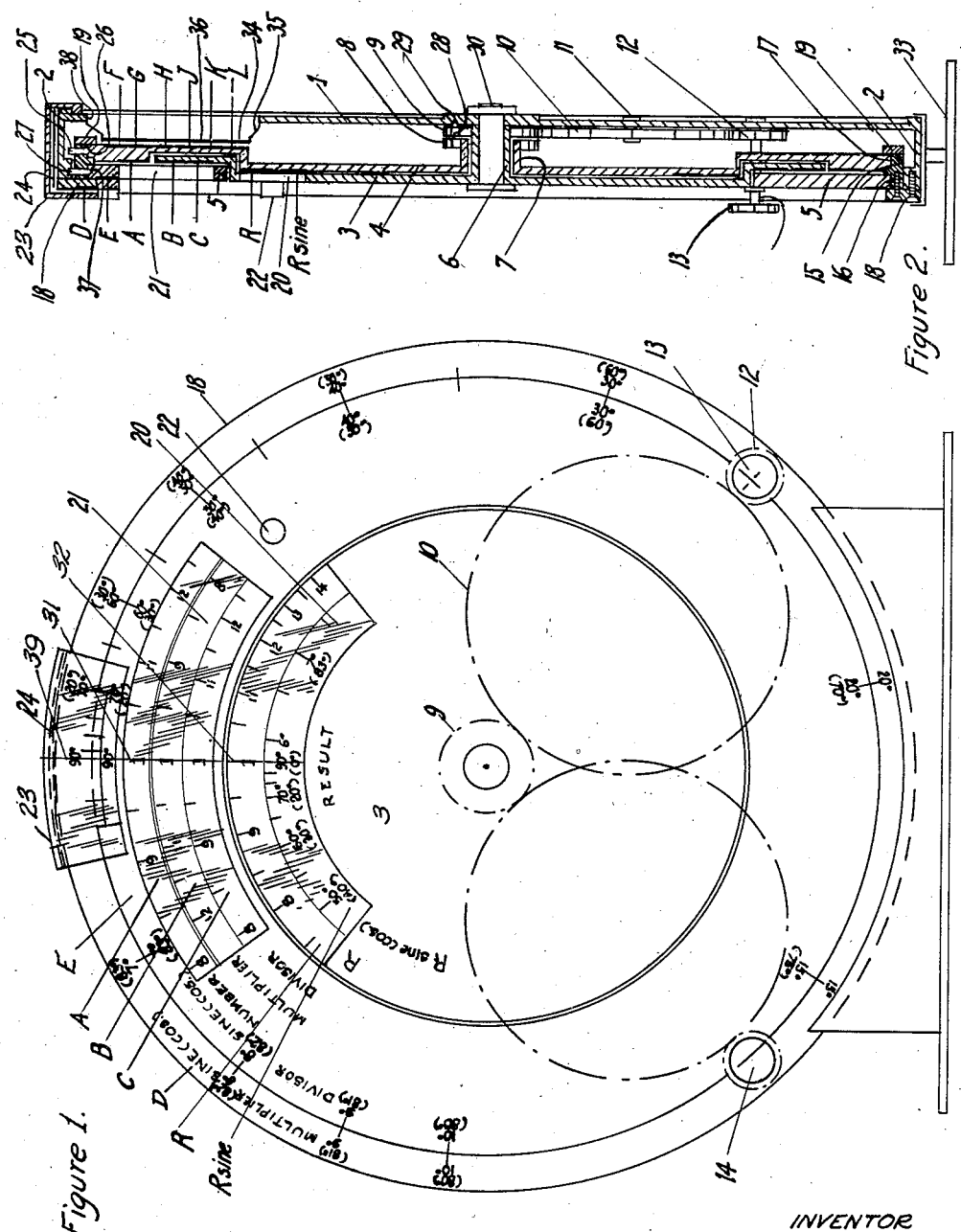

Feb. 4, 1947.  O. E. BATORI  2,415,231

SLIDE RULE

Filed May 20, 1944  6 Sheets-Sheet 1

INVENTOR
OSCAR E. BATORI
BY
*Julian J. Wittal*
ATTORNEY

Feb. 4, 1947.  O. E. BATORI  2,415,231
SLIDE RULE
Filed May 20, 1944  6 Sheets-Sheet 2

INVENTOR
OSCAR E. BATORI
BY
Julian J. Wittal
ATTORNEY

Feb. 4, 1947. O. E. BATORI 2,415,231
SLIDE RULE
Filed May 20, 1944 6 Sheets-Sheet 3

INVENTOR
OSCAR E. BATORI
BY
Julian J. Wittal
ATTORNEY

Feb. 4, 1947.  O. E. BATORI  2,415,231
SLIDE RULE
Filed May 20, 1944  6 Sheets-Sheet 6

INVENTOR
OSCAR E. BATORI
BY
ATTORNEY

Patented Feb. 4, 1947

2,415,231

UNITED STATES PATENT OFFICE 2,415,231

SLIDE RULE

Oscar E. Batori, New York, N. Y.

Application May 20, 1944, Serial No. 536,473

8 Claims. (Cl. 235—84)

This invention relates to computing devices of the slide rule type and specifically is an improvement upon a device of that character which forms the subject matter of my patent application for Letters Patent of the United States, filed August 2, 1941, Ser. No. 405,235. I have further developed that device which forms the subject matter of said application.

I have found that the interdependent support of the three rotatable members, the front dial member, the rear dial member and the indicator ring member of said application is not advantageous. That arrangement involved two successive steps in the solution of a simple calculation. First, holding fixed the indicator ring by one hand, the rear dial member had to be rotated and set by the other hand. Second, holding fixed the indicator ring member and the already set rear dial member by one hand, the front dial member had to be rotated and set by the other hand. In general, moving any of the three rotatable members care had to be taken of holding fixed the other rotatable members, and of keeping their previous settings.

One important improvement of the present invention is the independent support of each of the three rotatable members, the front dial member, the rear dial member and the indicator ring member. In consequence the two rotatable dial members not only can be rotated but also set simultaneously. Referring to a simple multiplication, the multiplicand set on the rear dial member and the multiplier set on the front dial member can be brought, that is set to their mutual indicator line—simultaneously in one step, instead of in successive steps as in the previous arrangement, thus greatly expediting the procedure. Prior slide rules had interdependent supports of their rotatable members—and their procedure had to be successive—similarly to the previous arrangement of my said earlier invention.

Another important improvement in the present invention is the application of scales on the indicator ring member and on the housing member, which as coacting scales create a second independent scale system in the same device. Thus two independent scale systems are created in cooperative relation in one device. One system is on the housing and on the indicator ring and the other on the two rotatable dial members. Each of these scale systems is on different members—and may be moved without putting in movement the scales of the other system. Prior slide rules have one base member, one slide member and one indicator. Their indicator had not been used to carry scales.

In my present invention, a slide rule has been devised by which the slide rule computations are simplified and expedited. In the application of the two cooperative scale systems new slide rule solutions had been created for computations involving different terms and new methods had been created for the solution of trigonometric problems. Another improvement is the automatic vertical setting of the rotating members and with it of their scales. "Vertical setting," it will be understood, is that the initial point of a scale on a rotating member is at the vertical line. If all scales are in vertical setting—all of their initial points are at the vertical line and in alignment. This is done by the application of spring operated pins on the rotating members and opposite recesses on the opposite fixed parts, all set corresponding to the vertical position of the initial points of the respective scales. These automatic vertical settings are of advantage when vertical setting is required in the procedure of the computation as it frequently occurs. Another application of it is to establish a contact point by the automatic setting between the two cooperative scale systems of the device.

Another improvement is the application of a separate peripherial indicator on the outer edge of the device—to facilitate the setting of numbers between graduations on the two coacting scales of the housing member and the indicator ring member.

Compared with prior slide rules, this is an added second indicator according to the two scale systems of this invention. This indicator is hand operated—and moved during the procedure of a simple computation, opposite to the other setting indicator ring member which is fixed during such procedures and to the result indicator opening—which is automatic in its application.

An improvement of this invention resides in the labelling of the scales therein, according to their functions in the computations. The four scales on the two rotatable dial members applied to perform numerical computations are labelled according to their designated functions as "Number," representing the number to be multiplied or divided; "Multiplier"—representing the multiplier, "Divisor" for the divisor and "Results" for the results. The procedure of a computation consists of the mechanical application of these labelled scales. Scales of trigonometric terms and of exponential terms are similarly labelled.

For the sake of better explanation of the advantages of my invention reference is made to the scale system and procedure of prior slide rules. In general they apply two scales to perform a multiplication or division. One scale is the base scale, the other the slide scale—the two comprising a working scale system. All the other scales of the slide rule are out of function in a simple computation. Generally the base scale is used for the multiplicand and product in case of multiplication, and for the dividend and quotient in case of division. These four ingredients of the two kinds of computations are represented by this one scale, the base scale. The slide scale represents in general the multiplier and the divisor in related computations.

Thus these six ingredients of a multiplication and of a division are represented by two scales—and the relative positions of these two scales have to be such as to satisfy their various applications, or in other words—certain setting rules have to be followed to make the different computations. The user must know how to set for a multiplication and how to set for a division, the two procedures being different. He has to know that the product is found opposite of the multiplier and on the base scale, on the other hand, the quotient will be found opposite the initial points of the slide scale—and on the base scale. The procedure varies for different computations and the location of the set numbers varies similarly. Moreover, the two working scales may change their roles. The slide scale may represent the multiplicand, the dividend, the product and quotient—and the base scale the multiplier and divisor—with accordingly changed setting rules—which has to be known and has to be followed. The procedures are complicated for users without mathematical background, and, in any case requires substantial mental effort in the setting.

This invention simplifies the procedure of the computations by eliminating the setting rules of prior slide rules. It applies one designated scale for the number to be multiplied or to be divided, one designated scale for the multiplier, one designated scale for the divisor and one designated scale for the result.

Each of these scales can be applied for the designated purpose only—and is the sole scale for that purpose. The procedure of a computation consists of a pure mechanical setting of the designated and labelled scales and is uniform for different computations and without any setting rules. A scale system is created in which three scales are required to make a multiplication or a division. It may be called a three working scale system. Two of the three would not satisfy. Each of the three scales are indicating different ingredients—and indicating different numbers at their respective indicators at the end of a computation. All settings of the factors of a computation have to be done at a permanent setting indicator which is fixed during the procedure of a simple calculation—and holds that position for other computations. The factors of a computation are in vertical position, facilitating the reading. Furthermore by the application of the scale labelled "Multiplier"—multiplication, or the application of the scale "Divisor," division is performed—implying the separation of the procedure of the multiplication and division and the further simplification of the computations.

The necessity of the application of three scales in the procedure of a simple calculation and the use of scales each designated for one specific purpose, give a new and positive character to the procedures of my device.

As it had been previously explained heretofore, prior slide rules had two scales in performing a simple calculation. If a third scale would be added, it would not change the character of its scale system and procedure, the added third scale only would duplicate the work and the indication of one of the other two scales. For instance the product would be indicated on the base scale and on the third added scale too. There would not be any reason for such duplication. On the other hand, two solutions would be available simultaneously—on two scales, and not one solution only. The duplicated action—and the alternate usability of the two identical solutions is a procedure which is different in character of the character of the procedure of this invention.

This difference in the character of the procedure is also evident in continuous and combined computations, as it will be explained in the illustrative examples here to be presented.

These and other objects of the invention are obtained by the proper selection and disposition of log-scales and by an adequate arrangement embodied in the device, as it will be described in detail, hereinafter, reference being had to the drawings, in which:

Fig. 1 indicates the front face of the device.

Fig. 2 is a vertical cross sectional view of the device.

Figure 2a indicates the spring operated setting pins in cross-sectional view, enlarged.

Figure 2b indicates the same part in plan view.

Figure 3:
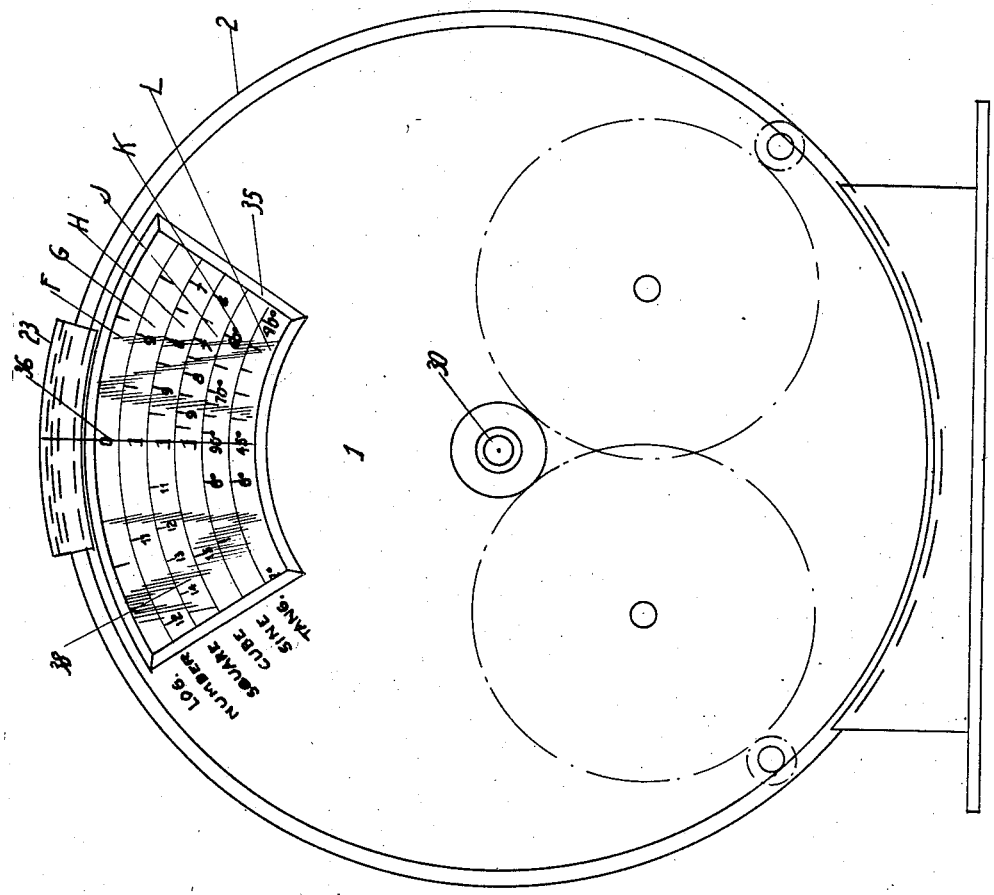

Fig. 3 indicates the reverse face of it.

Figure 4:
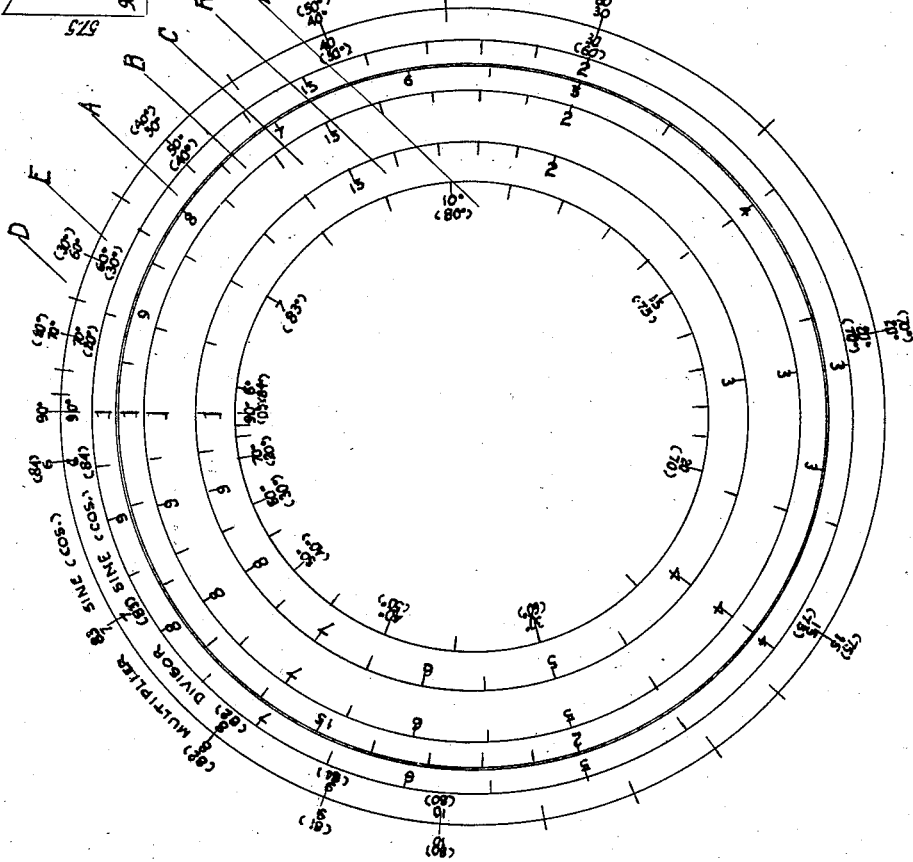

Fig. 4 indicates logarithmic scales in the front face of the device, selected and disposed to solve problems involving numerical, or sine, cosine, or combined numerical and sine, cosine-quantities.

Figure 5:
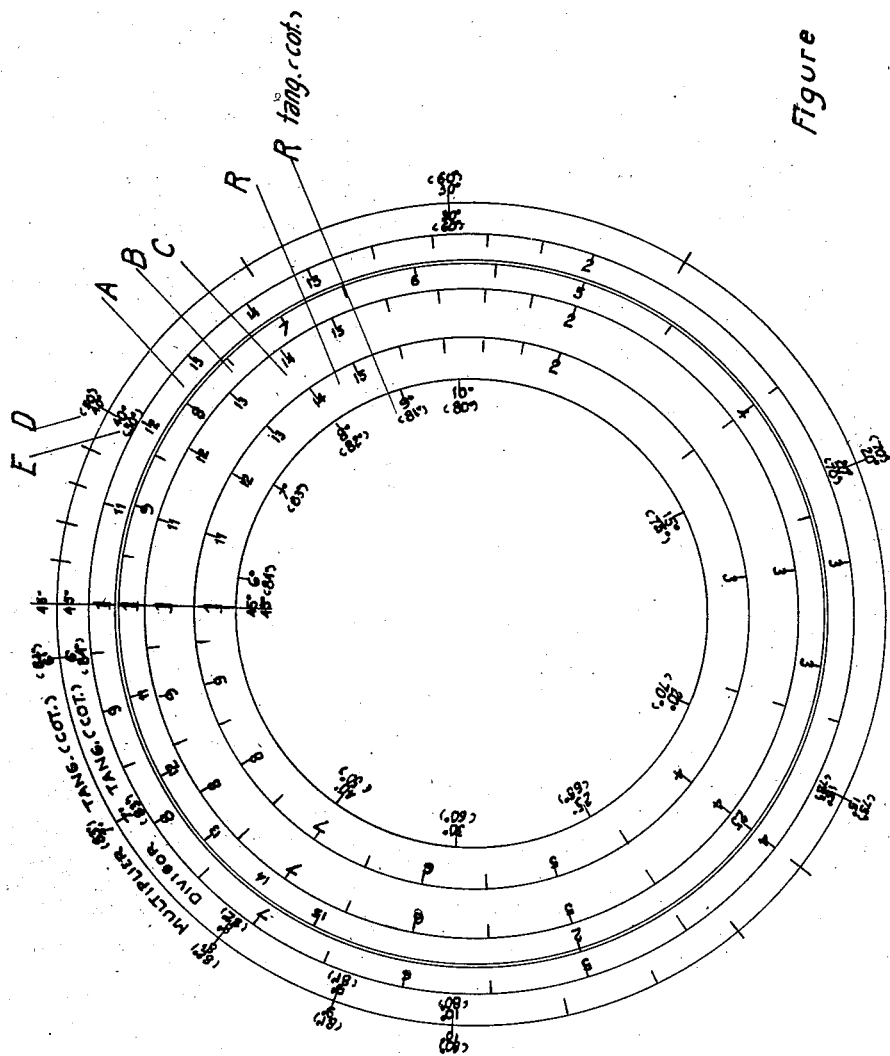

Fig. 5 indicates log-scales on the front face of the device with a variation in the scales to solve problems involving numerical or tangent, cotangent or combined numerical and tangent, cotangent quantities.

Figure 6:
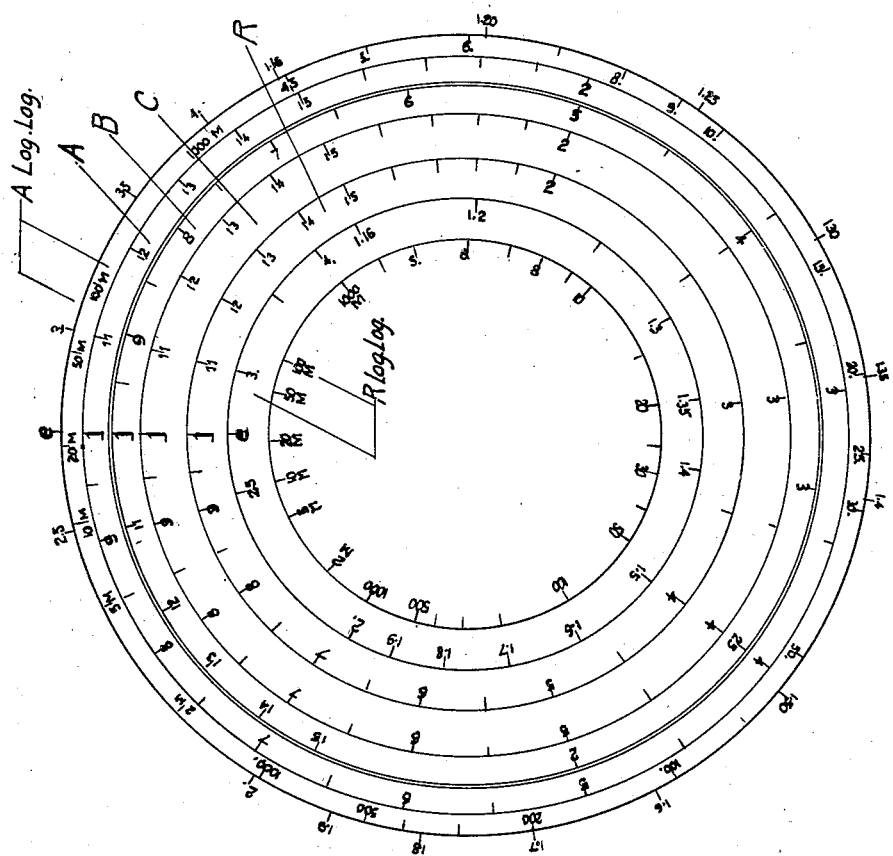

Fig. 6 indicates scales on the front face of the device with further variations to solve problems involving numerical and exponential quantities.

Figure 7:
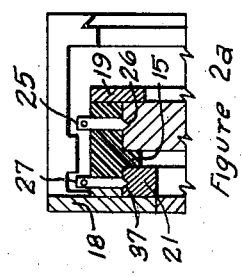
Figure 7:
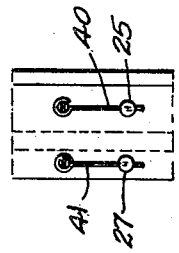
Figure 7:
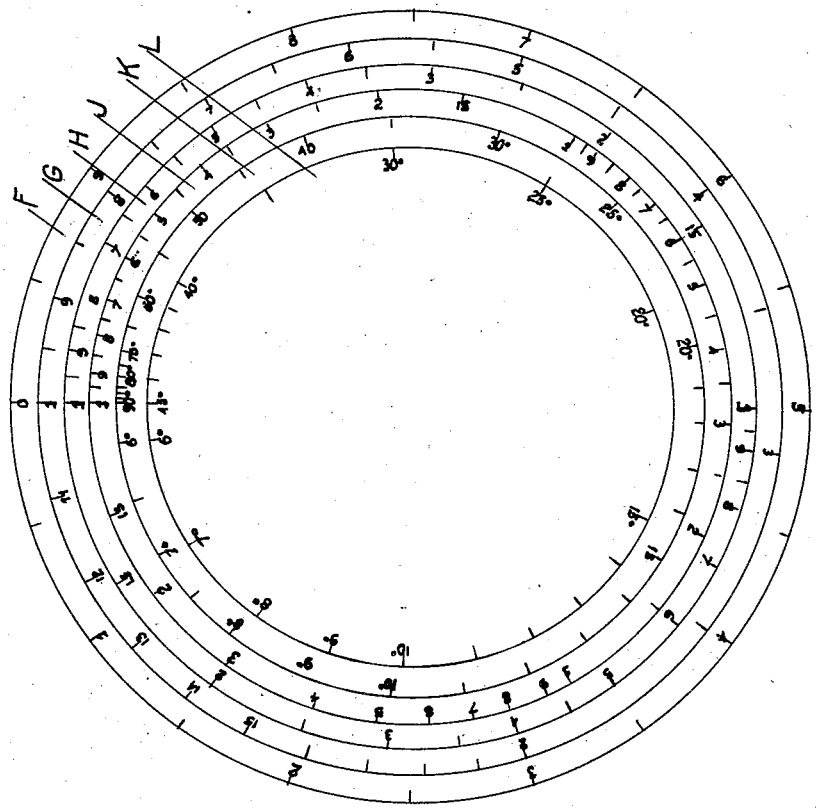

Fig. 7 indicates scales on the reverse face of the device.

Figs. 8, 9, 10, 11 show triangles to illustrate triangle solutions by this invention. The scales shown do not show the subdivisions.

Figs. 1, 2, and 3 show the arrangment and a scale system for numerical and sine, cosine quantities.

In said figures, the housing 1 is a circular plate with a forwardly directed flange 2 on its outer circumference. Front dial member 3, its outer part rearwardly offset, has a rearwardly directed hub 6, in its center part and carries the scales B, C, at its outer part, it has an opening 20 covered with glass or transparent plastic having a hairline or thin wire 32 in its middle. This opening exposes parts of the scales R and R sine, cosine on dial member 4, and is called the result indicator, being the permanent and automatic indicator of the products or quotients (results) of a computation. It is labelled "Result." Mounted on hub 6, is gear 9, which rotates the front dial member 3—and is in turn being rotated through the gears 10 and 12 and by the hand knob 13. The axle 11 carries gear 10, and axle 36 carries gear 12 and knob 13. Rotating knob 13 will rotate front dial member 3, and with it the scales B, C, and the result indicator opening 20 is also rotated.

Front dial member 3 is carried on its hub 6, by the bolt 30, which in turn is held in the housing 1.

Rear dial member 5 is offset at its outer part and it also has a front recess to accommodate the offset part of front dial member 3. At its outer edge it has an outwardly directed flange—which is holding it in position against longtudinal movements. It has at its center part a rearwardly directed hub 7, which in turn carries the gear 8. Gear 8 is driven by gears similar to gears 10 and 12 as shown. By rotating an appropriate hand knob 14 the intermediate gears, and gear 8 and rear dial member 4 will be rotated. Scales A and R, and R sine, cosine are rotated together with rear dial member 4. On the rear face of rear dial member 4 are placed the scales F, G, H, J, K, L, which also rotate when rear dial member 4 is rotated. The indicator ring member 5 is supported and held in place by front ring 18 and inner ring 15 as at 16. This indicator ring member has a pin 22 by which it may be rotated. It has an opening 21, which has a glass or transparent plastic plate therein and a scratched fine line, or thin wire 31 at its middle part. This opening exposes parts of the scales A on rear dial member 4, and parts of the scales B and C on front dial member 3. The opening 21 and the line 31 in its middle, in the indicator ring member 5, is called the setting indicator.

The indicator ring carries the designations for the scales. "Number" is the designation for scale A and the scale A has to be used for the number to be multiplied or divided. "Multiplier" is the designation of scale B and the scale B has to be used for multiplier. "Divisor" is the designation of scale C and scale C has to be used for the divisor. In each case in the corresponding computations these designations indicate the respective scales as the sole scales for the given purpose. The said ring member 5 carries the designated scale E, labelled "Divisor sine, cosine," which has to be used in case division is to be made by the sine, cosine function of an angle, setting the desired degree to the vertical line of the housing—by moving the setting indicator to this line. Inner ring 15 has a front recess 16 in which is accommodated the rotating ring member 5 and has a rear recess 17 which accommodates the rear dial member 4. It is fixed to front ring 18 by screws. Front ring 18 is in turn screwed to housing flange 2. A rear ring 19 is screwed to inner ring 15 and holds in place rear dial member 4. The three rotating members, indicator ring member 5, front dial member 3, and rear dial member 4, each are independently supported and may be rotated successively or simultaneously.

Front ring 18 carries the scale D which is designated "Multiplier sine (cosine)" and has to be used if multiplication is to be made by the sine, cosine function of an angle.

Inner ring 15 carries two pins 25 and 27 which are held and pressed toward the center by wire springs 40 and 41 held by the inner ring 15 itself. Opposite these pins are recesses 26 and 37 in the corresponding opposite rotating dial members 4 and 5, in which the pins fit in. Gear 9 carries a similar pin 28, similarly held by a wire spring. Opposite this pin 28 is a recess 29 in the housing member 1 in which it fits in. The recesses 26 and 37 in dial members 4 and 5, and 29 in housing 1, are placed in such a way, that when the pins are in these respective recesses—the respective scales are in vertical setting, i. e., their initial points are at the vertical line and in alignment. This arrangement insures an automatic setting of the initial points of the scales to the vertical position of the setting indicator 23 is an indicator of transparent and elastic material. It has a scratched fine line in the middle by which the setting of numbers of the scales D and E, on ring 18, and on indicator ring member 5 respectively, are brought into alignment.

To use indicator 23 in the space between the knobs 13 and 14 at the lower part of the scales, it has to be removed by lifting up its front arm—which is elastic enough to permit its removal over the ring 18. Spring 24 holds indicator 23 by pressing it to the flange of the housing 1 at the rear face and to the front ring 18 at the inner face of said ring.

Stand 33 is indicated diagrammatically—and may be made to any requirements. The device may be operated either by holding it in hand, or by resting it on stand 33.

Figure 3 indicates the rear face of the device. Housing 1 has an opening 38 in which is placed the indicator window 35 with a glass or plastic plate 34 on it and a scratched line or thin wire 36 in its middle. This line 36 is in alignment with the vertical line and consequently in alignment with the vertical settings of the scales on the front face of the device—and their indicator lines 31, 32 and 39.

For the sake of clarity selected scales and their disposition are shown in Figures 4, 5, 6 and 7 separately. In each figure is shown an independent arrangement for a given purpose. These scales shown in the different arrangements, of course can be set up together in one larger device and all used in one arrangement.

For the sake of these explanations the scales indicated in Figures 1 to 7 are designated by the capital letters A, B, C, D, E, F, G, H, J, K, and L—but they are not designated by these capital letters on the device itself. Thus, they all are designated according to their function as it had already been described hereinbefore and will be further described hereinafter.

Figure 4. Scales D—E are identical log sine cosine scales, the degrees for sine are indicated free, for cosine in parenthesis. D scale is on the housing and is stationary. E scale is on the indicator ring and can be rotated. Both are of full logarithmic unit length. These two scales comprise an independent scale system in sine and cosine terms. By setting the initial point (90°) of scale E to any degree on scale D, the multiplication by the sine, cosine functions of that degree is set. By setting any degree on scale E to the vertical line, i. e., to the initial point (90°) of scale D—the division by the sine or cosine function of that degree is set. By bringing two degrees on scale D and E in alignment the proportion of the sines or the cosines of those degrees are set. The procedure of multiplication or division with the sine, cosine functions are separated and the direct proportions of these functions are available.

Scales A, B, C and R are standard logarithmic scales of full logarithmic unit length for computations with numerical terms—and are the same for all arrangements shown in Figures 1 to 6. A, C, R are identical, B is inverted. To make a multiplication the three designated scales A, B and R are to be applied. A for the number to be multiplied, B for the multiplier and R will show the product. To make a division the three designated scales A, C and R are to be applied. A for the number to be divided, C for the divisor and R will show the quotient. The setting itself consists of bringing the desired numbers on the designated scales to the same setting indicator line of the setting indicator. The setting has to be done at a permanent place, at the permanent location of the setting indicator in simple computations and is uniform for multiplication and division. The result (product and quotient) is indicated automatically, and for both multiplication and division at the same result indicator. The setting of the two factors of a computation can be done simultaneously or successively. These four scales A, B, C and R comprise a separate and independent scale system for computations. In Figures 1 and 4 there is applied a sine, cosine scale as a result scale called "R sine (cosine)."

It indicates the proportion of two numerical values set by the scales A and C expressed directly in sine or cosine function of a degree.

This "R sine cosine" scale is carried by the rear dial member 4 and is rotated together with it. These two independent scale systems D and E, and the scales A, B, C and R are in cooperative relation. The indicator ring member 5 is their common member. By moving it the change in its relative position to the scales D and E is the same. In turn any change of its relative position to scale A can be transferred to the scale D or E or vice versa by the setting indicator, as it will be further explained with illustrative examples hereinafter.

Figure 5 shows an arrangement of scales for the solution of numerical and tangent cotangent functions. D scale is a tangent and cotangent scale and is on the housing. E is an identical tangent and cotangent scale on the indicator ring member 5 and is rotatable with that ring. Scale D is designated as "Multiplier tangent cotangent" and has to be used in case of multiplication by tangent or cotangent function of a degree. Scale E is designated as "Divisor, tangent, cotangent" and has to be used in case of division by the tangent or cotangent functions of a degree. Setting in alignment two degrees on scales D and E the proportion of the two tangent or cotangent functions is set in a direct way.

The scale "R tangent cotangent" on the rear dial member 4, adjacent to the scale R, is a tangent and cotangent scale. If a proportion of two numerical quantities are set by the scales A and C, the value of the proportion is expressed numerically on the scale R and in tangent cotangent functions of degrees on scale "R tangent cotangent." Here again two scale systems are created in a cooperative relation. One is of the scales D and E, of tangent and cotangent functions—the other is of A, B, C, R, of numerical terms. The procedures for different terms as tangent, cotangent, and numerical are separated, and the procedure of multiplication and division in each term are similarly separated.

By their common member, the indicator ring member 5, any value of the one scale may be transferred to the other scale. The setting of the scale E involves the move of the indicator ring and the placing of the desired degree on it to the initial point 45° of scale D.

Figure 6 shows an arrangement of scales for the solution of exponential functions. Designated as "A log. log." is a scale for the logarithms of logarithms of numbers, adjacent to scale A, on rear dial member 4. Designated as "R log. log." is an identical scale and is for the logarithms of logarithms of numbers and is adjacent to scale R, on the same rear dial member 4. Both, "A log. log.", and "R. log. log." are scales from 1.16–1,000,000. By adding one more log. log. scale to each of said scales the range limit can be extended under 1.16. Scale "A log. log." is for the numbers to be raised or to find the roots—and can be used for these purposes only. Scale "R log. log." is the only scale for the results in exponential functions. In connection and in cooperation with these said log. log. scales are the standard log. scales B and C on the front dial member 3. In this relation they are applied as representing the exponent of an exponential function. B scale is a designated scale for the power exponent, C scale is the designated scale for the root exponent and they can be used for these purposes solely. The application of these two scales B and C implies the separation of the procedure of power and root functions. To perform computations of power exponential functions the three designated scales "A log. log.", "B," "R log. log." are required, which comprise a three working scale system in one computation; each of these scales indicate different numbers (factors) at the end of the operation. To perform a computation of root exponential function the three designated scales "A log. log.", "C," "R log. log." are required, which comprise similarly a three working scale system in one computation, each of these scales indicating different numbers (factors) at the end of the operation. A new slide rule solution of exponential functions is created by the application of separate designated scales for the exponents and numbers in an exponential function, in a new scale system in which three cooperative scales must be used. Furthermore, the scales "A log. log." and "D" or "A log. log." and "C" and with them the two respective factors of the function can be rotated and set simultaneously; thus the procedure of such computation is expedited. The solution of exponential functions is simplified. Illustrative examples will be presented hereinafter to demonstrate the simplicity and speed of the solution later.

Figure 7 indicates the scales on the reverse face of the rear dial member 4. These are concealed by the housing 1, exposed only at the indicator opening 30. Scale "F" is indicating the logarithms of the numbers on the scale G, which is a standard logarithmic scale of one unit length; H is a standard logarithmic scale of two units indicating the squares of the numbers on scale G; J is a standard logarithmic scale of three logarithmic units indicating the cubes of the numbers on scale G; scale K is a sine scale of one unit length for degrees from 5° 44' to 90°, of which the numerical values are indicated on scale G; scale L is a tangent scale in one unit length for degrees from 5° 44' to 45°. All these scales are inverted with respect to the scale A on the front face of the rear dial member 4, their initial points are in alignment with the initial points of scale A and any value on them set to the indicator line 36 is corresponding with the numerical value indicated on scale A at indicator line 31 where it may be used for further computations in the front scale system by this cooperative relationship.

For the sake of explanation and to demonstrate the advantages of this invention illustrative examples will be presented here in numerical, trigonometric and exponential problems, with the indication of the procedure in the related problems. To more clearly demonstrate the advantages of my invention, the solutions of the same problems by prior slide rules will also be presented with comparative note related to the difference in the two procedures. For this purpose the slide rule of United States Patent 2,170,144 has been selected as one of the most advanced type of slide rules known at present. In these examples the scales of this invention will be referred to by capital letters as shown in the figures, thus: A, instead of scale A: B, instead of scale B, etc.

In addition to the letters, in some cases, the designation of the scale also will be given, thus: B, for "multiplier," C for "divisor," etc.

*Example 1.*—To illustrate the procedure of a simple multiplication.

$$2 \times 3 = 6$$

Solution: Simultaneous setting of the two factors:

2 on A, designated "number"
3 on B, designated "multiplier"

Read result at permanent result indicator 32.

6 on R, designated "result"

Both factors, 2 and 3 are set to the same fixed setting indicator and both are in vertical position.

*Example 2.*—Illustrates the procedure of a simple division:

$$\frac{4}{2} = 2$$

Solution: Simultaneous setting of the two factors:

4 on A, designated for "number"
2 on C, designated for "divisor"

Read result at permanent result indicator:

2 on R, designated for "result"

Both factors, 4 and 2, are set to the same fixed setting indicator and both are in vertical position.

The settings are uniform for Examples 1 and 2—and at the same setting indicator.

*Example 3.*—Illustrates the procedure of a continuous and combined computation:

$$\frac{12}{14} \times \frac{14}{6} = \frac{168}{84} = 2$$

Solution: Setting first the two factors of the numerator: 12 on A, designated "number," move setting indicator to 1 on A and set 14 on A.

Thus the multiplication of the two factors of the numerator is done—to make the division by the two factors 14×6 of the denominator the procedure is transferred to the designated divisor scale C. Move the setting indicator to 1 on C. Set 14 on C, designated "divisor"

Move setting indicator to 1 on C

Set 6 on C

Read results at permanent result indicator:

2 on R, designated "result"

The procedure was consecutive, first for the numerator, then for the denominator. The same result can be achieved by changing the procedure and setting the numbers of the numerator and denominator alternately.

It is the advantage of this invention that it indicates not only the final result which is 2, but simultaneously the result of the numerator 168, and the resultant of the denominator 84.

Restore vertical position of the setting indicator and read 168 on A
84 on C
2 on R All the three ingredients of the computation: 168, 84 and 2 are indicated—in adjacent positions in the setting indicator, on the designated scales, corresponding to their characters 168 on number scale A, 84 on the divisor scale C, and 2, on the result scale R. This example shows the procedure which is continuous and furthermore demonstrates the principle of the designated scales—which are keeping their designated character to the end of the procedure. It is a new slide rule solution of combined computations—not possible by any prior slide rule.

Examples 1, 2 and 3 will now be presented as solved by prior slide rules.

*Example 1.*—$2 \times 3 = 6$.

Setting:

Draw indicator to 2 on D
Set 1 on D to indicator
Draw indicator to 3 on C

Read results on scale D at indicator.

In this procedure—the indicator has been moved and set twice, the slide once and according to the setting rule of the slide rule for multiplication, which may be expressed by the proportion equation:

$$\frac{1}{2} = \frac{3}{(6)}$$

The procedure consisted of three steps.

*Example 2.*—

$$\frac{4}{2} = 2$$

Setting:

Draw indicator to 4 on scale D
Set 2 to on scale C to indicator
Draw indicator to 1 on C In this procedure the indicator has been moved twice, the slide once and both set according to the setting rules of the slide rule for division, which may be expressed by the proportion equation:

$$\frac{2}{4} = \frac{1}{(2)}$$

The procedure consisted of three consecutive steps. This proportion equation in its set up and application is different from the proportion equation used in Example 1 for multiplication and expresses the difference of the two kinds of computation. The result as indicated in parenthesis will be found in case of multiplication opposite the multiplier, and in division opposite 1.

The procedure with my invention is uniform for both, multiplication and division, and the setting is done in a purely mechanical way—by designated scales and without setting rules. Its main advantage is the simultaneous setting of the two factors of the computation, in one step—evidently faster than the procedure of three consecutive steps. Its simplicity is further increased by the elimination of the indicator movements. My invention has one indicator fixed during the procedure of a simple calculation, and another which is moved automatically.

*Example 3.—*

$$\frac{12}{14} \times \frac{14}{6} = \frac{168}{84} = 2$$

The procedure of solution with prior slide rules consists of the application of the scales C and D—in consecutive steps, either alternately or successively.

Setting:

Draw indicator to 12 on D
Set 14 on C to indicator
Draw indicator to 14 on C which is already done by the previous setting in this case.

Set 6 on C to indicator
Draw indicator to 1 on C

Read results: at indicator on D.

In this procedure the scale C has been used alternately for 14 as multiplier and for 14 and for 6 as divisors, the scale D has been used as for the multiplicand 12 and for the result 2—that is, scales C and D changed their character during the procedure—destroying their previous settings at each time. In consequence at the end of the procedure only the result 2 is indicated and the resultants of the numerator 168 and of the denominator 84 are not indicated and are not available as it is the case with my invention.

Examples 1, 2 and 3 are problems with numerical terms and are solved by the inner scale system A, B, C, R for such terms.

For computations involving numerical and trigonometric terms the two scale systems of this invention are applied—in cooperative relation. There is used the outer scale system, consisting of scales D and E, Figures 2, 5 and 6, for the trigonometric terms, and the inner scale system, consisting of A, B, C and R for the numerical terms. In each system there are scales for multiplication and for division so designated. In this arrangement the computation is simplified by the separated procedure for different terms and by the separate procedure for the different computations in each term—and also new slide rule solutions are created for trigonometric and related triangle problems. Illustrative examples are presented hereinafter with references to corresponding triangle problems. In each case the solution by prior slide rules also is presented, with a comparative note to demonstrate the advantages of this invention.

*Example 4.—*This example illustrates a problem in which proportion of related numerical values is expressed in sine function in a direct procedure on the same face of the device. It is related to a right triangle problem, Figure 10.

$$\frac{57.5}{115} = (\text{sine } 30°)$$

Solution: Set simultaneously 57.5 on A
115 on C

Read results: 30° on "R sine," result scale.

The solution consists of the application of designated scales, it is direct, following the original set up form of the equation, as given, and on the same face of the device, in one step, involving two settings.

Figure 10:
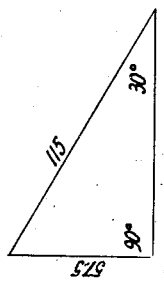

*Example 5.—*Illustrates multiplication of combined numerical and trigonometric terms, related to a right triangle problem, Figure 10.

$$\text{Sine } 30° \times 115 = (57.5)$$

Solution:

30° on "multiplier sine" scale D
115 on "number" scale A

Read result at permanent result indicator 32 at its vertical positions.

(5.75) on "result" scale R

Two steps required

The procedure is similar for computations involving division by a sine function—using in such case the scale "Divisor sine, cosine"—scale E. In both cases the number to be multiplied or to be divided is set to the fixed indicator and on the same scale A, and similarly the result in both cases is indicated automatically at the same result indicator and on the same result scale R. In this respect the solution is uniform. Prior slide rules have one numerical scale and one coacting sine scale for the solution of such problems, as shown hereinafter for Examples 4 and 5.

*Example 4.—*

$$\frac{57.5}{115} = (\text{sine } 30°)$$

The solution requires the setup of a proportion equation:

$$\frac{(\text{Sine } 30°)}{57.5} = \frac{1}{115}$$

and the corresponding slide rule settings in two steps. The corresponding two steps can be done simultaneously by this invention and without a proportion set up, directly on the designated scales.

*Example 5.—*Figure 10 (with prior slide rules).

$$\text{Sine } 30° \times 115 = (57.5)$$

Solution:

Draw indicator to 115 on D
Draw 1 on slide to indicator
Draw indicator to 30° on sine scale Read result: (57.5) on D at indicator.

(Slide rule of mentioned patent.) Three steps required. In case of division by sine function the setting is different. The difference of the two settings for the multiplication and of the division by the sine function may be expressed by proportion equations. In case of multiplication this proportion equation is:

$$\frac{\text{Sine } 30}{(57.5)} = \frac{1}{115}$$

In case of a problem involving division by the sine function for instance:

$$\frac{115}{\text{Sine } 30} = (230)$$

the proportion equation required is:

$$\frac{\text{Sine } 30}{115} = \frac{1}{(230)}$$

These two equations are different and show the difference of the two solutions. The results in parenthesis appear at different locations, in the case of the multiplication opposite sine 30°, in the case of division opposite 1. They also indicate the indirect solution by the required application of the proportion principle. This invention has a uniform setting for both multiplication and division and simpler solution directly in the given form of the problem, as explained before.

A further advantage in the solution of such problems by this invention is that in such cases the result is indicated at the same vertical position of the result indicator, a feature of the procedure which renders a positive character for the procedure.

Direct solutions are also available by prior slide rules, but only by the use of both faces of the rule.

Figure 8:
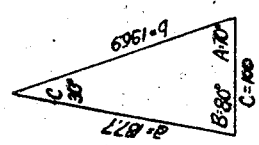

*Example 6.*—Figure 8. Illustrates a problem in which the proportion of sine functions is multiplied by a numerical factor.

$$\frac{\text{Sine } 80°}{\text{Sine } 70°} \times 187.7 = (196.9)$$

Solution: Set in alignment 80° on designated multiplier sine scale, D

70° on designated divisor sine scale E
    187.7 designated number sine scale A

Read result: (196.9) on designated result scale R at vertical position of the result indicator.

Two scale systems are applied—D and E for the sine functions, A and R for the numerical terms. The solution is direct, following the given set up of the problem. There is a direct proportion setting of the two sine functions. The result is indicated at the vertical position—similarly as in Example 5. The procedure is characterized and simplified by the separate and designated scales and the vertical standard position always at the same place, at 32 of the result in such cases. This is the oblique triangle problem, in which two angles and one side, the side opposite one angle is given and the other side is to be found.

*Example 6.*—With prior slide rules. They have no direct solution as it is given in the equation of the problem, and have no direct proportion setting of two sine functions, having only one sine scale.

Their solution requires the set up of a proportion equation:

$$\frac{\text{Sine } 70°}{187.7} = \frac{\text{sine } 80°}{(196.7)}$$

and the corresponding settings—in three steps.

*Example 7.*—Figure 8. This example illustrates a new slide rule solution by this invention of a frequently occurring triangle problem, in which two sides and the included angle is given the two other angles and the third side are to be found.

Given: $a = 187.7$, $b = 196.9$, $C = 30°$.
To be found: A, B, and c.
The solution has to satisfy the following two conditions:

1.     $\frac{a}{b} = \frac{\text{sine } A}{\text{sine } B} = \frac{187.7}{196.9} = 0.96$ 2.     $(A \text{ plus } B) = 180° - 30° = 150°$ In other words the proportion of the two known sides equals with the proportion of the sine functions of the two angles sought.

Setting: Simultaneously 187.7 on A
    196.9 on C

Resultant: 0.96 on A.
Move indicator to 1. on A.

In this phase of the procedure the sine scales D and E are in such a relative position—that any two degrees on them in alignment, will be in the same proportion as the proportion of the two sides—and thus the first condition stated above is satisfied, in three steps.

To satisfy the second condition find, by inspection on scales D and E, two degrees in alignment the sum of which equals 150°.

By inspection on scale D angle $A = 70°$

On scale E angle $\frac{B = 80°}{150°}$

This one additional step, altogether four steps are required. To find the third side c of the triangle, the case and procedure is similar to that in Example 6.

The equation is:

$$\frac{\text{Sine } 30°}{\text{Sine } 70°} \times 187.7 = c = (100)$$

and the solution is:
Set in alignment

30° on D
    70° on E
    187.7 on A

Read result at result indicator at its vertical position: 100 on R.

The second phase of the procedure, requires three steps. The complete solution in two phases requires seven steps.

In this solution the two independent scale systems coacted and the direct proportion setting of sine functions is applied. The solution is direct, following the equation of the given triangle conditions.

This advantage of the solution of this invention of such problems is more clearly evident when compared with the solution of prior slide rules, which have no direct solution for such problems.

Figure 9:
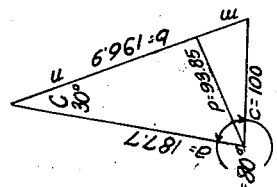

Figure 9 indicates the solution with prior slide rules. The problem is broken in two parts by dividing the triangle in two triangles, drawing a perpendicular p to the one known side b.

Thus three new elements are entering in the procedure: $p$, $n$, and $m$. The solution involved the application of the sine and tangent laws, the set up of four proportion equations in three phases and nine steps.

1. Equation for $p$, $n$ and $m$ $$\frac{\text{Sine } 90°}{187.7} = \frac{\text{sine } 30°}{(p)} = \frac{\text{sine } 60°}{(n)}$$

$$m = b - n$$

2. Equation for angle A $$\frac{(\text{tang } A)}{p} = \frac{1}{m}$$

3. Equation for the side C $$\frac{\text{Sine } 90°}{(c)} = \frac{\text{sine } 70}{93.85}$$

Solution:
    Draw indicator to 187.7 on D
    Draw 1 on scale C to indicator
    Draw indicator to 30° on sine scale
    Read 93.85 at indicator on $D = p$
    Make notation of 93.85 for later use
    Draw indicator to 60° on sine scale
    Read at indicator on D 162.54—$n$
    Draw indicator to 34.20 on D
    Draw to indicator 1 on tangent scale
    Draw indicator to 93.85 on D
    Read at indicator on tangent scale 70°— angle A
    Draw 70° on sine scale to indicator
    Draw indicator to 1 on sine scale
    Read $100 = c$ at indicator on scale D During the procedure notation had to be made reading 93.85, this intermediate resultant during the procedure being destroyed and again required.

The solution with my device does not require the four proportion set ups, the added application of the tangent scale, the notation of an intermediate resultant, in other words those auxiliary methods and two additional steps of prior slide rules are not required. The solution is simple and expeditious—by the designated and separate scales and the shortened procedure.

Figure 11:
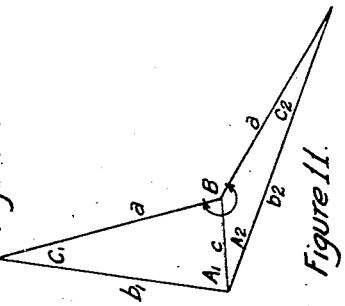

*Example 8.*—Figure 11, illustrates the solution of a frequently occurring special trigonometric problem, in which two triangles are solved combined. This example is selected to demonstrate the advantage of this invention in such cases. The two independent scale systems and the direct proportions of sine functions on designated scales.

Given: One side "$a$"=240, equal in the two triangles.
Angles $C_1$=23°40′, $C_2$=9°50′, $B$=225°30′
$C_1$ plus $C_2$ plus $B$=259°0′
$(A_1$ plus $A_2)$=360°−259°=101°

To be found: $A_1$, $c$.

1. $\dfrac{\text{Sine } A_1}{\text{Sine } A_2} = \dfrac{\text{sine } C_1}{\text{sine } C_2} = \dfrac{\text{sine } 23°\ 40'}{\text{sine } 9°\ 50'}$ 2. $(A_1$ plus $A_2)$=101°

Setting: In alignment

23°40′ on D
9°50′ on E

At this phase of the procedure any two degrees on D and E in alignment—are in the same proportion setting as $C_1/C_2$=23°40′/9°50′. To satisfy Equation 2—find by inspection on D and E two degrees, the sum of which is 101°, then $A_1$=76° on D
$A_2$=25° on E To find C the one common side of the two triangles, the procedure is similar to that described in Example 6.

$$C = \dfrac{\text{sine } 23°\ 40'}{\text{sine } 76°} \times 240$$

Solution: Set in alignment

23°40′ on D
76° on E
Set    240 on A

Read result at result indicator at its vertical position—

100 on R

Altogether five steps required. This is a new slide rule solution, simple and expeditious, on the same face of the device. Prior slide rules have no such solution.

The required coacting three scales in one computation, the designated scales and the simultaneous setting of the two factors are more clearly visible in case of exponential problems as it will be presented in illustrative examples.

*Example 9.*—Illustrates a power function:

$$2^{3.715} = (12.94)$$

Solution: Set simultaneously 2 on number scale "A log. log."
3.715 on power scale "B"

Read result: (12.94) on result scale "R log. log."

*Example 10.*—Illustrates a root function $$\sqrt[3.715]{12.94} = (2)$$

Solution: Set simultaneously 12.94 on scale "A log. log."
3.715 on root scale C

Read results (2) on "R log. log."

In these examples the number to be raised (2) and the number to be rooted (12.94) is set on the same scale for number, the "A log. log." scale, similarly the results for both cases (12.94), (2), are indicated on the same result scale the "R log. log." scale. In this respect the procedure is uniform for the two kinds of computation. The power exponent 3.715 is set on scale B, the root exponent 3.715 is set on scale C, thus the procedure for the two kinds of computation is separated, it is simplified, and has a more positive character. Three scales are applied in one computation and each indicates a different number. "A log. log." scale indicates 2, B scale indicates 3.715—and "R log. log." scale indicates (12.94). Two scales, one A log. log. representing the number 2 to be raised and the other B representing the exponent, 3.715 are rotated and set simultaneously, greatly expediting the procedure. New and better slide rule solutions are created by this invention for exponential functions. Prior slide rules have a composite pair of scales for the solution of exponential problems, similarly as for trigonometric problems. Their solutions for power and root problems, are different, they have different setting rules for power and root exponential problems. This difference can be expressed by the proportion equations.

*Example 9.—*

$$2^{3.715} = (12.94)$$

Solution (slide rule of mentioned patent):

Draw indicator to 2 on log. log. scale
Draw 1 on C to indicator
Draw indicator to 3.715 on C Read result: (12.94) on log. log. scale.
Three steps required.
The corresponding proportion equation is:

$$\dfrac{1}{2} = \dfrac{3.715}{(12.94)}$$

*Example 10.—*

$$\sqrt[3.715]{12.94} = (2)$$

Solution:

Draw indicator to 12.94 on log. log. scale
Draw 3.715 of C to indicator
Draw indicator to 1 on C Read result (2) at indicator on log. log. scale.
Three steps required.
The corresponding proportion equation is:

$$\dfrac{1}{(2)} = \dfrac{3.715}{12.94}$$

The result is found in Example 9 opposite 3.715, in Example 10 opposite 1, indicating the difference in the procedure. In each case the solution involved three steps and the handling of the indicator. The solution with this invention involves one step consisting of two simultaneous settings and no indicator handling is required.

*Example 11.*—Illustrates an exponential problem in which the exponent is to be found.

$$2^{3.715} = 12.94$$

Solution:

Set 2 on number scale "A log. log."
12.94 on result scale "R log. log."

Read the power (3.715) on power scale B at the setting indicator. It is a direct solution following the form of set up of the exponential equation on designated scales.

Prior slide rules have to apply the proportion principle and accordingly first transform the given equation in a proportion equation:

$$\frac{1}{2} = \frac{(3.715)}{12.94}$$

and the procedure has to follow this equation.

*Example 12.*—Illustrates an exponential problem in which the number to be raised is to be found $$(2)^{3.715} = 12.94$$

Solution:

Set 3.715 on power scale B
12.94 on result scale "R log. log."

Read result: (2) on number scale "A log. log."

Direct solution according to the set up of the equation on designated scales. Prior slide rules have first to transform this equation in a proportion equation of:

$$\frac{1}{(2)} = \frac{3.715}{12.94}$$

Solution (slide rule of mentioned patent):

Draw indicator to 12.94 on log. log. scale
Draw 3.715 on C to indicator
Draw indicator to 1 on C Read result: (2) on log. log. scale.

The procedure involves the set up of a proportion equation, and thus it is an indirect solution, similar to Example 11. The two proportion equations are different requiring different solutions. This invention applies a direct solution, uniform in both cases.

What I claim as new is:

1. A slide rule comprising a base member having a logarithmic scale thereon; a second member movably related to the first member and having thereon an identical logarithmic scale; a third member movably related with respect to the first two members and having thereon three logarithmic scales of the same modulus as the first said two logarithmic scales but inverted with respect thereto; a fourth member movably related with respect to the said first three members and having thereon two logarithmic scales, identical but inverted with respect to each other and of the same modulus as the scales on the first three members; an indicator opening being in the second member cooperating with the indicia of one logarithmic scale of the third member and two logarithmic scales of the fourth member; another indicator opening in the fourth member cooperating with the indicia of the two logarithmic scales of the third member.

2. A slide rule comprising a base member having a logarithimc scale of the sine, cosine functions thereon; a second member movably related to the first member and having thereon an identical logarithmic scale of the sine, cosine functions; a third member movably related with respect to the first two members and having thereon two identical logarithmic scales and one logarithmic scale of the sine, cosine functions, the last mentioned three scales having the same modulus as the first said two scales, but inverted with respect thereto; a fourth member movably related with respect to the said first three members and having thereon two logarithmic scales, identical but inverted with respect to each other, and of the same modulus as the scales on the first three members; an indicator opening being in the second member cooperating with the indicia of one logarithmic scale of the third member and two logarithmic scales of the fourth member; another indicator opening in the fourth member cooperating with the indicia of the two logarithmic scales of the third member.

3. A slide rule comprising a base member having a logarithmic scale of the tangent, cotangent functions thereon; a second member movably related to the first member and having thereon an identical logarithmic scale of the tangent, cotangent functions; a third member movably related with respect to the first two members and having thereon two identical logarithmic scales and one logarithmic scale of the tangent, cotangent functions, the last mentioned three scales having the same modulus as the first said two scales, but inverted with respect thereto; a fourth member movably related with respect to the said first three members and having thereon two logarithmic scales, identical but inverted with respect to each other, and of the same modulus as the scales on the first three members; an indicator opening being in the second member cooperating with the indicia of one logarithmic scale of the third member and two logarithmic scales of the fourth member; another indicator opening in the fourth member cooperating with the indicia of the two logarithmic scales of the third member.

4. A slide rule comprising a base member; a second member movably related to the first member; a third member movably related with respect to the first two members and having thereon two identical logarithmic scales and two identical logarithmic logarithmic scales; a fourth member movably related with respect to the said first three members and having thereon two logarithmic scales, identical but inverted with respect to each other and of the same modulus as the logarithmic scales on the third member; an indicator opening being in the second member cooperating with the indicia of the outer logarithmic scale and the logarithmic logarithmic scale of the third member and the two logarithmic scales of the fourth member; an indicator opening being in the fourth member cooperating with the indicia of the logarithmic and logarithmic logarithmic scales of the third member.

5. A slide rule comprising a base member having scales thereon; a second indicator ring member with an opening in it, in front of and movably with relation to the first member and having scales thereon; a third rear dial member, between the first mentioned two members, movable with respect to them, and having scales thereon; a fourth front dial member within the second and in front of the third member, movably related to the first said three members and having scales thereon; indicator openings in said second and fourth members; and independent supports for each said dial member and indicator ring member, with spaced relationship and no frictional contact between said dial members or between dial members and the ring member.

6. A slide rule comprising a base member having scales thereon; a second indicator ring member with an opening in it, in front of and movably with relation to the first member and having scales thereon; a third rear dial member, between the first mentioned two members, movable with respect to them, and having scales thereon; a fourth front dial member within the second and in front of the third member, movably related to the first said three members and having scales thereon; indicator openings in said second and fourth members; and independent means for each dial adapted to rotate and set them, whereby the dials may, at will, be set either individually or simultaneously.

7. A slide rule comprising a base member having scales thereon; a peripherally supported second indicator ring member, with an indicator opening in it, in front of and movably related to the first member; a peripherally supported third rear dial member, between the first mentioned two members, movable with respect to them and having scales thereon; a centrally supported fourth front dial member, movably related with respect to the first said three members and having scales thereon and an indicator opening therein.

8. In a slide rule as set forth in claim 5, means in the plane of the rear dial member and the ring member respectively and acting radially, to set the rear dial member and the ring member and the scales thereon in predetermined positions, whereby respective computations are reduced in procedure and expedited.

OSCAR E. BATORI.

REFERENCES CITED

The following references are of record in the file of this patent:

UNITED STATES PATENTS

| Number | Name | Date |
| --- | --- | --- |
| 974,354 | Brown | Nov. 1, 1910 |
| 1,075,124 | Scheibli | Oct. 7, 1913 |
| 2,117,155 | Dussel | May 10, 1938 |
| 2,170,144 | Kells, et al. | Aug. 22, 1939 |
| 2,301,033 | Findlay | Nov. 3, 1942 |